(12) United States Patent
Chang

(10) Patent No.: US 7,826,093 B2
(45) Date of Patent: Nov. 2, 2010

(54) SCAN-TO-PRINT COLOR RENDERING

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 770 days.

(21) Appl. No.: 11/684,518

(22) Filed: Mar. 9, 2007

(65) Prior Publication Data

US 2007/0146754 A1    Jun. 28, 2007

Related U.S. Application Data

(63) Continuation-in-part of application No. 11/188,609, filed on Jul. 24, 2005, now abandoned.

(51) Int. Cl.
*H04N 1/40* (2006.01)
(52) U.S. Cl. .................. 358/2.1; 358/1.16; 358/504
(58) Field of Classification Search .................. 358/1.9, 358/2.1, 3.03–3.05, 1.16, 504, 527
See application file for complete search history.

(56) References Cited

U.S. PATENT DOCUMENTS

| | | | |
|---|---|---|---|
| 5,053,866 A | | 10/1991 | Johnson |
| 5,107,332 A | * | 4/1992 | Chan ..................... 358/518 |
| 5,375,002 A | | 12/1994 | Kim et al. |
| 5,452,112 A | | 9/1995 | Wan et al. |
| 5,481,380 A | | 1/1996 | Bestmann |
| 5,491,568 A | | 2/1996 | Wan |
| 5,497,180 A | * | 3/1996 | Kawakami et al. .......... 347/131 |
| 5,537,516 A | | 7/1996 | Sherman et al. |
| 5,809,366 A | | 9/1998 | Yamakawa et al. |
| 6,721,062 B1 | * | 4/2004 | Sawada et al. ............... 358/1.9 |
| 6,977,663 B2 | | 12/2005 | Chang |
| 7,046,863 B2 | | 5/2006 | Chang et al. |
| 7,061,645 B2 | | 6/2006 | Chang |
| 7,102,789 B2 | | 9/2006 | Chang |
| 2002/0196484 A1 | | 12/2002 | Chang |
| 2005/0162703 A1 | | 7/2005 | Chang |
| 2005/0213121 A1 | | 9/2005 | Chang |
| 2006/0022998 A1 | | 2/2006 | Chang |
| 2006/0061781 A1 | | 3/2006 | Chang |
| 2006/0238792 A1 | | 10/2006 | Chang et al. |
| 2007/0019217 A1 | | 1/2007 | Chang |

\* cited by examiner

*Primary Examiner*—Thomas D Lee
*Assistant Examiner*—Stephen M Brinich
(74) *Attorney, Agent, or Firm*—Larry K. Roberts

(57) ABSTRACT

Scan-to-print color rendering in a system including a scanner engine and a print engine may include, in an exemplary embodiment, storing or providing an index table of respective scanned values in a scanner color space corresponding to each output color printed by the print engine. A color target may be scanned using the scanner engine to provide digital image data in a scanner color space. For each image-scan pixel, a closest scanned value is selected from the index table for a corresponding output color. A color difference is determined a between the image-scan pixel and the closest value as an error for that image-scan pixel. Color error diffusion is applied to compensate for the color difference by distributing the error to neighbor pixels.

21 Claims, 3 Drawing Sheets

SCAN-TO-PRINT COLOR RENDERING

CROSS-REFERENCE TO RELATED APPLICATION

This application is a continuation-in-part of application Ser. No. 11/188,609, Jul. 24, 2005 now abandoned the entire contents of which are incorporated herein by this reference.

BACKGROUND

Color image reproduction may be accomplished by scanning a work piece, e.g. a document, photograph, drawing or the like, using a color scanner or color scanner engine to create a scanned image file, and using a color printer or print engine to print the file. Typically, the color image reproduction has employed scanner color calibration and conversion processing, printer color calibration and conversion processing, and halftone processing. This color image reproduction is typically processor intensive and time-consuming.

SUMMARY OF THE DISCLOSURE

Scan-to-print color rendering in a system including a scanner engine and a print engine may include, in an exemplarily embodiment, storing or providing an index table of respective scanned values in a scanner color space corresponding to each output color printed by the print engine. A color target may be scanned using the scanner engine to provide digital image data in a scanner color space. For each image-scan pixel, a closest scanned value is selected from the index table for a corresponding output color. A color difference is determined a between the image-scan pixel and the closest value as an error for that image-scan pixel. Color error diffusion is applied to compensate for the color difference by distributing the error to neighbor pixels.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
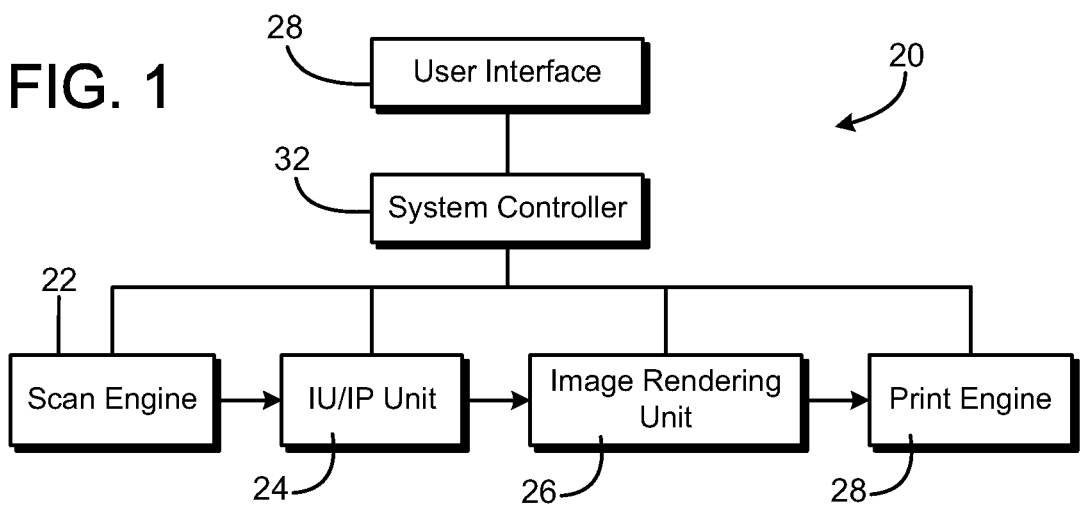
FIG. 1 is a schematic block diagram of an exemplary embodiment of a color copier system.

In the following detailed description and in the several figures of the drawing, like elements are identified with like reference numerals. The figures are not to scale, and relative feature sizes may be exaggerated for illustrative purposes.

An exemplary embodiment of a color copier system 20 is depicted in FIG. 1. The system may include a scanner engine 22, an image understanding (IU) and image processing (IP) unit 24, an image rendering unit 26 which may provide for scan-to-print color rendering, and a print engine 28. A user interface 30 may allow the user to control or operate the system. A system controller 32 may control the operation of the scanner engine, the IU and IP unit, the image rendering unit and the print engine. A typical IU unit may perform image segmentation; to analyze the scanned image areas and category them into several types of objects such as a text area, a graphic area, and a pictorial image area. A typical IP unit may improve these objects differently based on the type of the object, e.g., sharpening for the text and graphics, dehalftoning for the pictorial regions, and applying different color conversion and color enhancement for the different areas. The segmentation or IU-IP may be applied directly on the raw scanned data, instead of color calibrated data.

The scanner engine 22 may be one of any of a number of scanner engines, e.g. including a CCD sensor array by way of example. In an exemplary embodiment, the scanner engine may produce a scanner output data in a first color space, e.g. a RGB color space such as scanner RGB.

The print engine 28 may be an electrophotographic system, an ink jet system, or other type of print engine such as a graphic arts printing system. In an exemplary embodiment, the print engine operates in a color space which is different than the color space of the scanner engine 22. For example, the print engine 28 may operate in a CMYK, a CMY or a printer RGB color space.

A scan-to-print color rendering technique may be employed in the color copier or MFP system to provide closed-loop color rendering for the scan engine 22 and the color print engine 28 of the system. In an exemplary embodiment, an index table is provided or created, which includes, for each output color of the color print engine, a scanned RGB value obtained by scanning the output color with the scanner engine. This index table may be used during color rendering. For each image-scan pixel during a scan-to-print job, the closest output color to the color of the image-scan pixel value is obtained, e.g. using the index table, and the color difference between the input color and the output color is calculated. Color error diffusion is applied to compensate for the color difference by distributing the error to neighbor pixels. The output is an error-diffusion-like halftone, and is used to drive the color print engine. In an exemplary embodiment, no other halftoning or color conversion is applied.

Figure 2:
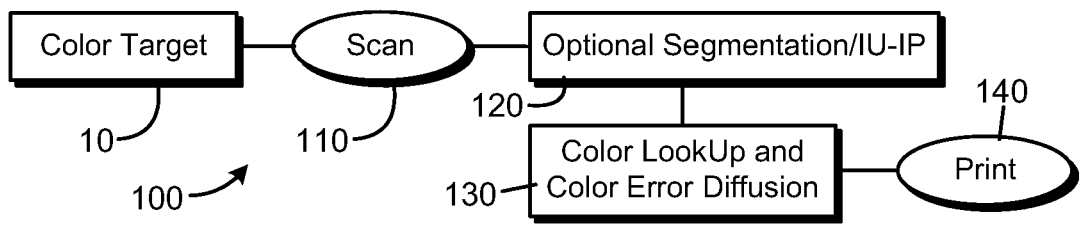
FIG. 2 is a process flow diagram illustrating an exemplary embodiment of a scan-to-print color rendering technique.

FIG. 2 diagrammatically illustrates an exemplary scan-to-print color rendering technique 100. A color target 10, e.g. a document with color images or a photograph, is scanned at 110 by a color scanner, to provide a scanned data set or file, e.g., raw scanned data, representative of the color target. The raw scanned data may optionally be processed at 120 using segmentation and image understanding (IU) and image processing (IP) depending on the particular implementation of the color copier or MFP system. At 130, a color lookup and color error diffusion (ED) processing is applied to the image data to provide output data, which is used at 140 to print a reproduction of the color target 10.

In an exemplary embodiment, the color rendering process employs color palette index tables A and B. Color palette A is an index table to specify the scanned values for each output color, and color palette B is an index table to specify how to print each output color.

The following examples illustrate values of the color palette B index table for different print dots.

EXAMPLE 1

Bi-Tonal, Single Pixel for the Print Dot

PaletteB[8][4]={{0, 0, 0, 0},{1, 0, 0, 0},{0, 1, 0, 0},{0, 0, 1, 0},{1, 1, 0, 0},{1, 0, 1, 0}, {0, 1, 1, 0},{0, 0, 0, 1}}; in which "1" is "ink on" and "0" is "no ink" (white). Each sub array shows the {c,m,y,k} values. For example, {1, 1, 0, 0} means print cyan and magenta for the current pixel. PaletteB[8][4] is a form of two-dimensional (2-D) array used in many computer programming language such as 'C.'. [8] means there are 8 entries in the array, and [4] means each entry has 4 elements. In an exemplary case, there are 8 output (printing) colors. Since the printing color space in an exemplary embodiment is in CMYK, there are 4 color values, c,m,y and k, for each output color.

2. Bi-tonal, dot size is 2 by 1 pixels:

PaletteB[8][2][4]={ . . . {{0, 1, 0, 0},{0, 1, 0, 0}},{{0, 1, 0, 0,},{0, 0, 0, 0}}, . . . }; the first dot has both pixels print magenta, and the second dot only has one pixel print magenta and the other pixel is white. This makes 2 density-levels for magenta (for each color out of 7 possible/printable colors (7=8-white)). PaletteB[8][2][4] represents a three-dimensional (3-D) array, in which [8] represents 8 output colors, [4] represents CMYK, i.e. 4 elements/values, and [2] indicates two density levels; dark, and light (e.g., dark cyan and light cyan). Thus, in this example, there are 8 entries and each entry has 2 density levels and each has 4 elements. The example shows one entry only with 2 levels, and there are many more. A 3-D array of [8][2][4] may be the same as a 2-D array of [16][4], since the 2-D notation indicates there are 16 entries (output colors) and each has 4 elements.

3. 2-bit, single pixel for the dot size:

PaletteB[n][4]={{0, 0, 0, 0},{3, 0, 0, 0},{2, 0, 0, 0},{1, 0, 0, 0} . . . }. 2-bit output color provides 3 levels for each color, i.e. light (1), medium (2) and full (3) color. In this example, the first color {0, 0, 0, 0} is white, the second color {3, 0, 0, 0} is full cyan, the third color {2, 0, 0, 0} is median cyan, and the fourth color {1, 0, 0, 0} is light cyan. To utilize 3 levels of output densities for each color, a large number of entries may be set in color palette B. In this example, [n] defines how many combinations of color are to be used. For example, it may be desired not to use any color together with black, (e.g., no {3, 0, 0, 3}), and no 3-component colors other than pure gray are to be used (e.g., (2, 2, 2, 0), may be used but {2, 2, 1, 0} may not be used.

For the bi-tonal output case, example 2 discussed above, the minimum number of output colors is n=8. For 2-level or 3-level densities, n should be much greater than 8, such as 22, 32, 40, or even greater, in an exemplary embodiment.

Figure 3:
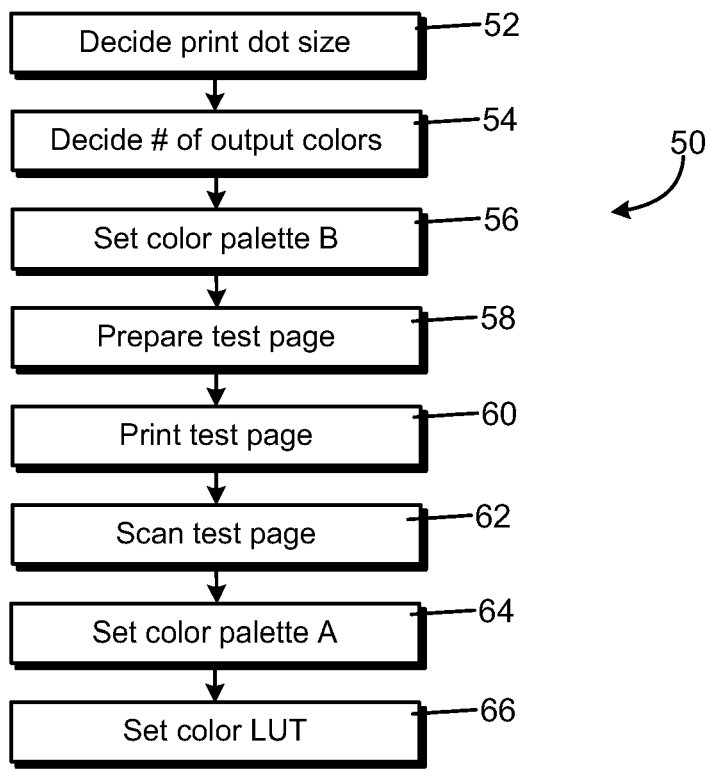
FIG. 3 is a process flow diagram depicting an exemplary technique for device color calibration.

The color copier system may be calibrated in an exemplary embodiment by a process 50 depicted in FIG. 3. At 52, a print dot size is selected. The print dot size may be designed for the particular application. A print dot may contain a single pixel, or 2 by 1 pixels, or 2 by 2 pixels, depending on factors such as the printing dot gain. For example, a 2 by 2 pixel cell may be suitable for a typical electrophotographic print engine. The number of output colors to be utilized is selected at 54. For example, a bi-tonal print engine can print c, m, y, l, c+m, and m+y of seven colors other than white. A 4-bit engine may theoretically be capable of printing 15 different colors on a single pixel. An 8-bit engine may theoretically by capable of printing 255 different colors on a single pixel.

At 56, the color palette B is set up. Once the number of output print colors to be utilized has been determined, that number is also the number of entries for both the color palettes A and B. Based on the print dot size and the number of output colors to be utilized, an index table, color palette B, is set to specify how to print each output color.

A test page may be printed by the print engine at 58. The test page includes many different color patches, including patches of all the different colors. Each patch is printed on a location on the page which is assigned for that color. The test page may have several patches at different locations for each color. The patches printed for the same color on the different positions on the test page may have color variation, and the scanned value may also very. Therefore, for measuring a test color, several samples are printed at different positions, and the scanned values are averaged, in an exemplary embodiment.

At 60, the test page is scanned by the scanner engine. The scanned values for each color patch may be averaged to provide averaged scanner RGB values for each color. At 64, the color palette A is set, and at 66, a color lookup table (LUT) may be set up, as described more fully below.

Figure 5:
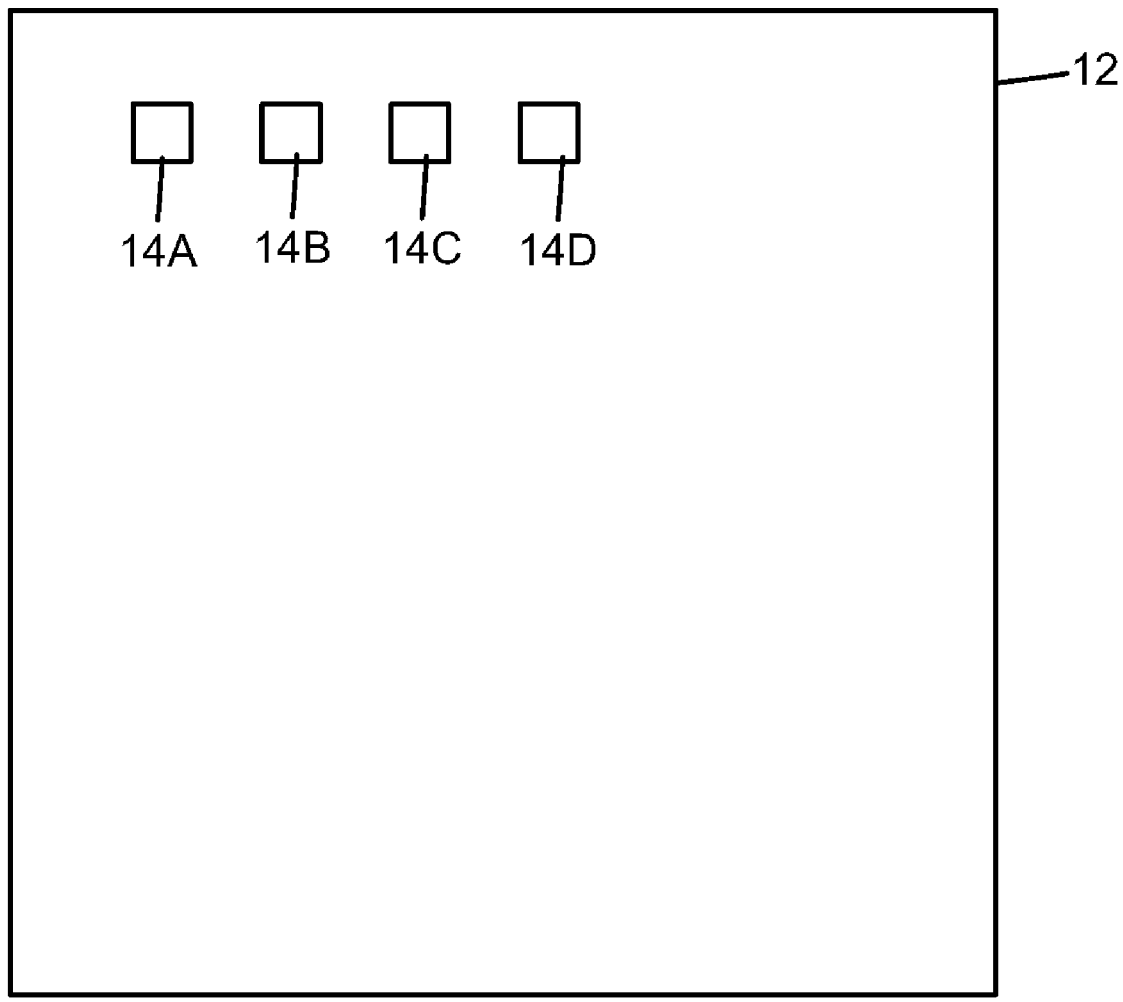
FIG. 5 illustrates a simplified test page printed during a calibration process for a color rendering process.

In the first example of palette B given above, there is a test color of {1, 0, 0, 0} in the second position. This color is test printed several times on the different positions on the test page, say four times. FIG. 5 illustrates diagrammatically a test page 12 on which four positions 14A-14D are assigned to the test color of {1, 0, 0, 0}, and test patches are printed for this color, e.g. using the print engine 28 (FIG. 1). When the test page 12 is scanned by the scan engine 22, four sets of RGB values are obtained for this color. After averaging, an RGB value may be obtained which corresponds to the print color {1,0, 0,0}, say an RGB value of {20, 225, 238}, for example. In this case, the RGB value of {20, 225, 238} is assigned to palette A in the second position, i.e. corresponding to the test color of {1, 0, 0, 0}.

For an exemplary embodiment of the color rendering process for the first example above, a color search may be performed for a scanned color value to find the closest color among the 8 colors in palette A. The color search may be based on the Euclidian color distance—the smaller the distance, the closer the color—distance=$[\Delta R^2+\Delta G^2+\Delta B^2]^{1/2}$. After the color search for a scanned color, say {30, 221, 244} for RGB, the color search found that the color {20, 225, 238} is the closest color among the 8 colors in palette A, so the rendering process selects the index number of 1 (in this example, the array index number starts from 0, so 1 is the second item). Then the print engine looks for the second color from the palette B to print, that is, {1, 0, 0, 0}, cyan.

In an exemplary embodiment, color palette A is an index table to specify the scanned values for each output color using the particular scanner engine 22, and color palette B is an index table to specify how to print each output color using the particular printer engine 28. Following are exemplary procedures to calibrate the device colors and prepare palettes A and B for a particular pair of a scanner engine and a printer engine.

An initial step is to decide or design the print dot size. A print dot may contain a single print pixel, 2 by 1 pixels, or 2 by 2 pixels depending on how strong the printing dot gain. For example, a 2 by 2 cell may be suitable for a typical electrophotographic print engine.

A second step is to decide how many output colors should be utilized. For example, a bi-tonal engine can print c, m, y, k, c+m, c+y, and m+y of 7 colors other than white. A 4-bit engine may be capable of printing 15 different density levels per each color channel on a single pixel theoretically. Therefore, there are 16×16×16 possible output colors available ideally. However, in an exemplary embodiment, several levels may not be stable to print and many of the three-component colors are not favored for halftoning. The number of "good" output colors is less than the ideal or theoretical number in an exemplary embodiment, and so the number of colors used will be less than the theoretical number. Use of a smaller number of output colors would also reduce the computation for color searching. An 8-bit engine is capable of printing 255 density levels per each color channel, theoretically, and so the number of possible output colors for this engine is higher than the 4-bit engine.

The number of output colors is also the number of entries for both color palette A and B. Based on the dot print size and the number of output colors, an index table of color palette B may be set to specify how to print each output color using the particular scanner engine 28.

A test page with many color patches/tints that includes all the output colors is then created and printed by the print engine 28. The test page may have several patches at different locations for each color.

The test page is scanned by the scanner engine 22, and the scanned values of the different color patches for each color are averaged. The averaged scanner RGB values for each color are then arranged in an array, the color palette A.

In an exemplary embodiment, a three-dimensional (3-D) color lookup table (LUT) for the scanner RGB colors may be utilized. The LUT is set for a fixed size, say, 16×16×16. For each table entry, the color distances from the entry color to each entry in color palette A are compared. The respective entry colors represent possible scanner RGB values. The output color in palette A with the shortest distance is then selected for the current table entry. For some embodiments, the 3-D LUT may provide a significant reduction in real time processing load, since the LUT values may be established during a calibration mode or other mode when the machine is not in use for scan-to-print rendering jobs. Each LUT value is mapped to an entry in color palette A. For some applications, in which the number of colors in the LUT is greater than the number of colors in the color palette A, a value in the color palette A may be mapped to more than one value in the LUT.

In the first example described above of palette B, i.e., bi-tonal, single pixel for the print dot size, the color palette A may be used for the 3-D color lookup table. Every time a scanned color is rendered, all 8 colors in the palette A are compared to the scanned color to determine the shortest color distance from a table value to the scanned color. The color search may be based on the Euclidian color distance. In an exemplary embodiment, this calculation may be performed in real time by the rendering engine or processor. Alternatively, a pre-generated 3-D lookup table may be employed to reduce the processing load.

For the third example described above of palette B, i.e., the 2-bit, single pixel for the dot size, the palette A may have, for example, 22 colors. In this example, it may be too time consuming to search in real time for each color. So, a 16×16×16 LUT may be designed for RGB scanned values. For example, {0, 255, 255}, {16, 255,255}, {32, 255, 255} . . . {255, 255, 127}. A pre-search may be performed for each color to get the closet palette A output color. The pre-search may be based on the Euclidian color distance. The 3-D lookup table is therefore generated prior to use in normal scan-to-print rendering jobs. For each scanned RGB color value during normal operation, the values may be correlated to the nearest position in the 3-D table, and directly get the output color from lookup. The speed is very high. So, in this example, the 3-D table is generated from palette A. The color lookup table in this example may sample the possible input colors into a limited number of entries. For example, a 3-D table of [17][17][17] for [r][g][b] values gives 17×17×17 sample colors. Each table entry may be pre-searched for the closest output color and use the index for the results. While performing the actual color rendering, it will be very fast to look up the "closest" table entry color to find out the result output color. For example, if table[0][1][15] is 8, when the input color is close to r=0, g=1×16=16, and b=15×16=240, then the output color will be looked-up from the 8th color in the paletteB, say cmyk={255, 240, 0, 0}. For example, say the sample colors for R in the 3-D table are: 0, 15, 31, 63, 95, 127, . . . etc., and when the scanned input color is R=28, it will map to R=31. Similar mapping would be done for G and B colors. The error diffusion will compensate the color difference as described below.

Figure 4:
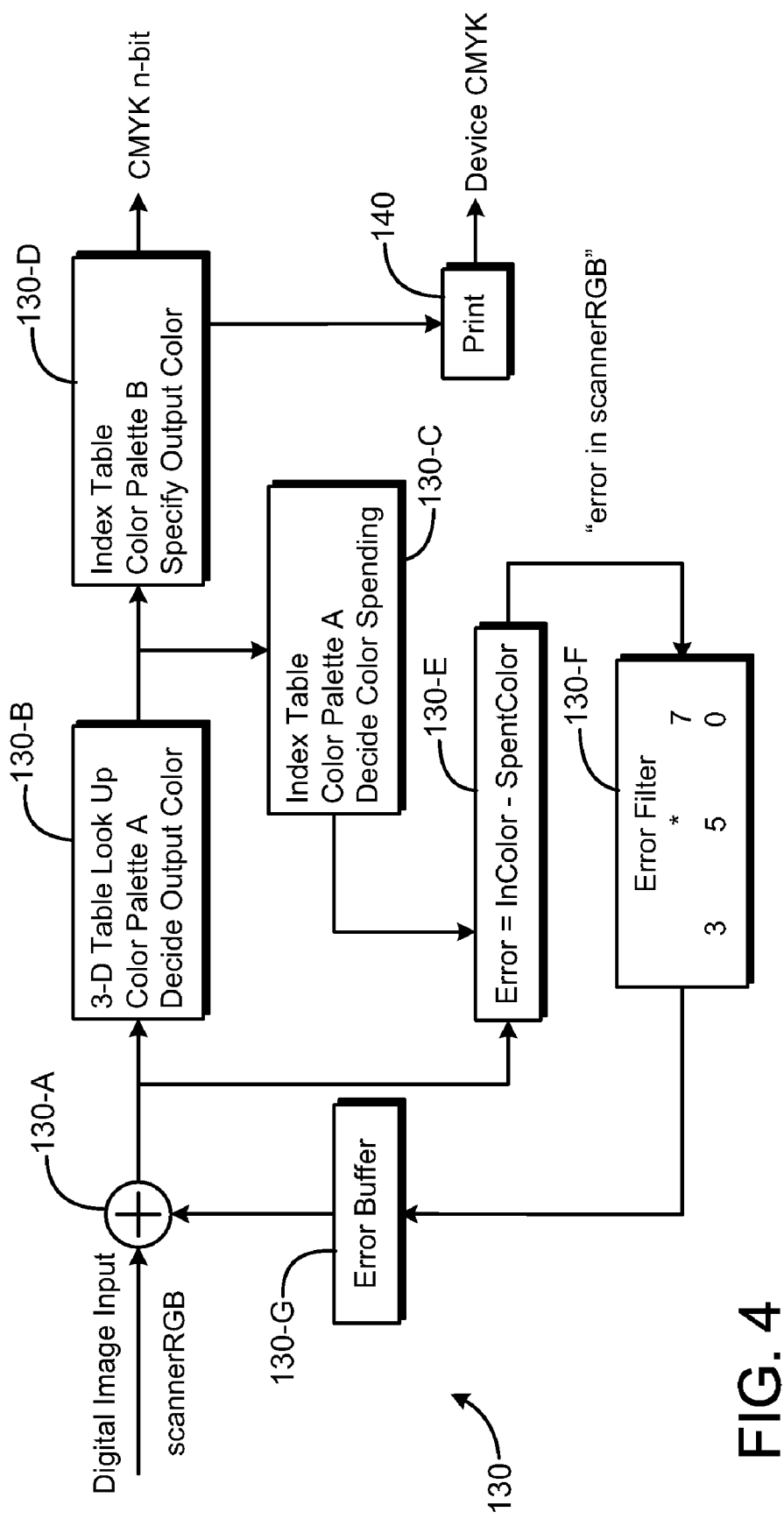
FIG. 4 is a schematic diagram illustrating an exemplary technique for rendering color input data from a scanner into color output data for a color print engine.

FIG. 4 illustrates an exemplary embodiment of the color lookup and color ED processing function 130. This may be performed, in an exemplary embodiment, in a scan-to-print rendering engine of a color copy system as depicted in FIG. 1. Digital image input data is input from the scanner engine 22, and in an exemplary embodiment is in scannerRGB color space, i.e. the scanner-engine-specific RGB color space. At 130-A, the digital input data is combined with error diffusion data from error buffer 130-G, described below, and the resultant is sometimes referred to herein as "InColor" data. The InColor data is then processed at 130-B, and also at 130-E. Process 130-B uses the InColor data to find the closest value in the color palette A index table. This may be performed by using a 3-D color LUT, wherein the InColor data is used as an index value. The result of process step 130-B is a selected one of the values stored in color palette A. It is to be recalled that each value in color palette A is a scanner value corresponding to one of the output colors in color palette B.

The output of 130-B is provided to process 130-D and to process 130-C. Since 130-C produces an output having a one-to-one correspondence with an output color produced by the print engine, the output of 130-C may be used, e.g. as an index pointer or through other straightforward processing, to select the corresponding output color value in color palette B. This output color value may be in print engine specific CMYK. At 140, the digital data from the image rendering unit is sent to the printer engine 28 for printing.

At 130-C, the output from 130-B is processed to determine a "color spending" value. For example, assume that the color search or table look up in 130-B decided the "nth" color in palette A (paletteA[n]) is the closest color to the current input color. Then the nth color in palette B (paletteB[n]) is designated to output, say to print a cyan dot and a yellow dot. Step 130-C looks back to paletteA[n] to get a set of RGB values that are "spent/printed," so that the difference/color error between the required (input) color and the printed color pixel can be determined.

Once this "color spending" value has been identified, an error determination or calculation takes place at 130-E to determine the R, G, B value differences that exist between those values which are associated with the finally selected output pixel, and those which are associated with received R, G, B pixel which led to the just-completed color-distance calculation. In an exemplary embodiment, this determination may be a calculation performed in real time by the rendering engine or processor. Alternatively, a pre-generated lookup table may be employed to reduce the processing load. The "color spending" value is subtracted from the InColor data value at 130-E to calculate a diffusion error value, i.e. "error in scannerRGB." These differences (R, G, B error values) are then fed to an error diffusion filter which is represented by block 130-F in FIG. 4.

Diffusion error calculation, and subsequent operation of the filter 130-F take place on a color channel by color channel basis. In other words, R error values are calculated and treated by the filter as R values, G error values are also so handled, and the same is true for B error values. In an exemplary embodiment, the error filter 130-F may take the form of a modified Floyd and Steinberg filter, which has the particular diffusion, or error, distribution pattern that is numerically indicated in FIG. 4. The modified Floyd and Steinberg filter 130-F differs from the well known version of the filter in that a zero [0] value replaces the one [1] position value, for bleed control. A five-member pixel pattern is shown in 130-F, with the * marking what can be referred to in each operation of the filter as the representative "neighborhood" position of the current pixel. This current pixel has four specifically located neighbors, and these neighbors are marked with respective numeric "values" which are seen to total to the number fifteen. This number total (fifteen) for the error diffusion filter may also be referred to as a defined distribution-weight totality number. These individual position values represent the proportions, relative to the total number fifteen, of a given R, G, or B error value which each of the respective actually positionally associated pixels in the current image R, G, B data file will "receive" via error diffusion according to the designed operation of the filter. Thus, for an example R error value of 32, 7/15 (or 16) will go the neighbor of the current pixel which sits relatively in the pixel position marked [7] in the filter illustration of FIG. 4. Similarly 3/15 (or 6), 5/15 (or 10) and 0/15 (or 0) will be distributed to those current-pixel neighbors which sit in the relative positions marked [3], [5] and [0], respectively, in box 130-F of FIG. 4.

The numeric distributions just described are presented by the filter 130-F to buffer 130-G. For each loop, the error buffer is updated. The buffer accumulates color errors from the surrounding 4 processed pixels, and the color errors, which may be either positive or negative error values, are combined appropriately with the digital image data at 130-A. For each input/scanned color for rendering, the propagated error value will be added to the input value to compensate the prior color errors.

Although the foregoing has been a description and illustration of specific embodiments of the subject matter, various modifications and changes thereto can be made by persons skilled in the art without departing from the scope and spirit of the invention as defined by the following claims.

What is claimed is:

1. A method for scan-to-print color rendering in a system including a scanner engine and a print engine, comprising:
    storing an index table of respective scanned values in a scanner color space corresponding to each output color of a set of output colors printed by the print engine;
    storing a color palette index table of values defining how the print engine prints each said output color of said set of output colors in a print engine color space;
    scanning a color target using a scanner system to provide digital image data comprising image-scan pixels in said scanner color space;
    for each image-scan pixel in said scanner color space, selecting from said index table the closest scanned value for a corresponding output color;
    using the selected closest scanned value to select a print engine color space value from the color palette index table and send the selected value from the color palette index table to the print engine;
    determining a color difference between the image-scan pixel and said closest value as an error for said image-scan pixel;
    applying color error diffusion to compensate for said color difference by distributing said error to neighbor pixels;
    printing an output image pixel or pixels using said corresponding output color as adjusted by said color error diffusion.

2. The method of claim 1, wherein said color difference determination is based on a Euclidean color distance.

3. The method of claim 1, wherein said scanner color space is an RGB color space, and the print engine color space is different from said scanner color space.

4. The method of claim 1, wherein said output color is in a CMYK or CMY or printer RGB color space, and the scanner color space is different from said print engine color space.

5. The method of claim 1, wherein said applying color error diffusion is done using a modified Floyd and Steinberg error filter.

6. A closed loop color rendering method for a particular pair of a color scanner engine and a color printer engine, to provide a capability of scanning a color image with the color scanner engine and print the scanned image with the color print engine, comprising a sequence of the following steps:
    storing a color palette index table B of values defining how the print engine prints each said output color of said set of output colors in a print engine color space;
    in a calibration sequence,
        printing a test page or test pages with all output colors to be used by the printer engine;
        scanning the test page or test pages with the scanner engine to collect scanned values of all the output colors and save the scanned values into an index table A, and wherein the scanned values are in a scanner color space for the particular scanner engine; and
    in a scan-to-print mode during scanning of a target image,
        scanning the target image to obtain image-scan input pixel values in the scanner color space;
        for each image-scan input pixel value of an input color, using the index table A to obtain the closest output color to print an output pixel, and calculating the color difference or error between the input color and the output color in the scanner color space;
        using the selected closest scanned value to select a print engine color space value from index table B and send the selected value from the index table B to the print engine;
        applying color error diffusion to compensate for the color difference or error by distributing the color difference or error to neighbor pixels;
        printing the output pixel of said closest output color using the particular print engine.

7. The method of claim 6, wherein said color difference determination is based on a Euclidean color distance.

8. The method of claim 6, wherein said scanner color space is an RGB color space, and the print engine color space is different from said scanner color space.

9. The method of claim 6, wherein said output color is in a CMYK color space, and the scanner engine color space is different from said SMYK color space.

10. The method of claim 6, wherein said applying color error diffusion is done using a modified Floyd and Steinberg error filter.

11. A color rendering method for a particular pair of a color scanner engine and a color printer engine, to provide a capability of scanning a color image with the color scanner engine and printing the scanned image with the color print engine, comprising:
    storing a color palette index table B of values defining how the print engine prints each said output color of said set of output colors in a print engine color space;
    scanning a target image to obtain digital image-scan input pixel values in a scanner color space, the scanner color space being a different color space from said print engine color space;
    using an index table A correlating each printer output color to a corresponding scanner-specific input color, for each image-scan input pixel value of an input color, obtaining the closest output color to print an output pixel;

using the selected closest scanned value from the index table A to select a print engine color space value from the color palette index table B, and sending the selected value from the color palette index table B to the print engine;

determining the color difference or error between the input color and the output color in the scanner color space for each image-scan input pixel value;

printing the output pixel of said closest output color using the particular print engine; and applying color error diffusion to compensate for the color difference or error by distributing the color difference or error to neighbor pixels; said distributing of the color difference including combining said error value with an input-image scan input pixel value.

12. The method of claim 11, wherein said color difference determination is based on a Euclidean color distance.

13. The method of claim 11, wherein said scanner color space is an RGB color space.

14. The method of claim 11, wherein said output color is in a CMYK or CMY or printer RGB color space.

15. The method of claim 11, wherein said applying color error diffusion is done using a modified Floyd and Steinberg error filter.

16. The method of claim 11, wherein said applying color error diffusion includes adding an error pixel value to an image-scan input pixel value before said using an index table.

17. A color rendering system, comprising:

a color scanner engine adapted to provide raw digital image-scan input pixel values of a scanned color image in a scanner color space;

a color printer engine adapted to receive print data in a printer color space which is different from said scanner color space and to print pixels corresponding to the print data, the color print engine configured to print a set of output colors;

an image rendering unit responsive to input digital pixel values comprising raw digital image-scan input pixel values from the scanner engine or digital image pixel data from an image understanding (IU) and image processing (IP) unit responsive to the scanner, to generate corresponding digital color image data in the printer color space, the image rendering unit comprising:

means for determining, for each input digital pixel value of an input color, the closest output color to print an output pixel, said means for determining including an index table A correlating each printer output color to a corresponding scanner-specific input color in the scanner color space;

a color palette index table B of print data values in the print engine color space, each value defining how the print engine prints an output color in the set of output colors;

means for using the selected closest scanned value from the index table A to select a print data value from the color palette index table B, and sending the selected value from the color palette index table B to the print engine;

means for determining a color difference or error between the input color and the output color in the scanner color space for each input digital pixel value; and means for applying color error diffusion to compensate for the color difference or error by distributing the color difference or error to neighbor pixels.

18. The system of claim 17; wherein said means for applying color error diffusion comprises means for combining said error value with an input digital pixel value.

19. The system of claim 17, wherein said means for applying color error diffusion includes a modified Floyd and Steinberg error filter.

20. The system of claim 17, wherein said image rendering unit comprises:

said color palette index table B of digital color values in the printer color space of each output color of the color print engine; and wherein said means for determining, for each input digital pixel value of an input color, the closest output color to print an output pixel, provides an index value from index A mapping to a value in the color palette table B.

21. The system of claim 17, wherein said index table A maps a limited number of possible input colors of the scanner engine into a corresponding output color of said set of output colors.

* * * * *